United States Patent [19]

Bloch et al.

[11] Patent Number: 4,517,104
[45] Date of Patent: May 14, 1985

[54] ETHYLENE COPOLYMER VISCOSITY INDEX IMPROVER-DISPERSANT ADDITIVE USEFUL IN OIL COMPOSITIONS

[75] Inventors: Ricardo Bloch, Scotch Plains; Thomas J. McCrary, Jr., Plainfield; Darrell W. Brownawell, Scotch Plains, all of N.J.

[73] Assignee: Exxon Research & Engineering Co., Florham Park, N.J.

[21] Appl. No.: 260,883

[22] Filed: May 6, 1981

[51] Int. Cl.$^3$ .................. C10M 1/32; C10M 1/40; C10M 1/20

[52] U.S. Cl. .................. 252/51.5 A; 252/33; 252/47.5; 525/301; 525/285; 525/374; 525/375; 525/382; 525/386

[58] Field of Search .............. 252/51.5 A, 33; 525/301, 285, 374, 375, 382, 386

[56] References Cited

U.S. PATENT DOCUMENTS

| | | | |
|---|---|---|---|
| 2,466,530 | 4/1949 | Blair, Jr. et al. | 252/392 |
| 2,568,876 | 9/1951 | White et al. | 106/14 |
| 2,604,451 | 7/1952 | Rocchini | 252/51.5 |
| 3,004,987 | 10/1961 | Paris et al. | 260/326.3 |
| 3,154,560 | 10/1964 | Osuch | 260/326.3 |
| 3,172,892 | 3/1965 | LeSuer et al. | 260/326.5 |
| 3,216,936 | 11/1965 | LeSuer | 252/32.7 |
| 3,219,666 | 11/1965 | Norman et al. | 260/268 |
| 3,316,177 | 4/1967 | Dorer, Jr. | 252/51.5 |
| 3,326,804 | 6/1967 | Hu | 252/34 |
| 4,089,794 | 5/1978 | Engel et al. | 252/51.5 A |
| 4,132,661 | 1/1979 | Waldbillig et al. | 252/51.5 A |
| 4,137,185 | 1/1979 | Gardiner et al. | 252/33 |
| 4,144,181 | 3/1979 | Elliott et al. | 252/33 |
| 4,160,739 | 7/1979 | Stambaugh et al. | 252/34 |
| 4,161,452 | 7/1979 | Stambaugh et al. | 252/34 |
| 4,169,063 | 9/1979 | Kiovsky | 252/51.5 A |
| 4,171,273 | 10/1979 | Waldbillig et al. | 252/51.5 A |
| 4,219,432 | 8/1980 | Girgenti et al. | 252/51.5 A |

FOREIGN PATENT DOCUMENTS

| | | |
|---|---|---|
| 1018982 | 2/1966 | United Kingdom . |
| 1065595 | 4/1967 | United Kingdom . |
| 1162436 | 8/1969 | United Kingdom . |

OTHER PUBLICATIONS

U.S. Ser. No. 896,864 corresponding to French published application No. 2423530, "Multi-Purpose Additive Compositions and Concentrates Containing Same".
U.S. Ser. No. 054,654, filed Jul. 3, 1979, "Stable Aminated Graft of Ethylene Copolymeric Additives for Lubricants".
U.S. Ser. No. 756,040, corresponding to German published application No. P2753569.9, "Succinimide Derivatives of a Copolymer of Ethylene and Alpha-Olefin".
U.S. Ser. No. 843,925, "Succinimide Derivatives of an Ethylene-Alpha-Olefin Terpolymer" (German No. 2845288).

Primary Examiner—Paul F. Shaver
Attorney, Agent, or Firm—Frank T. Johmann

[57] ABSTRACT

Oil soluble viscosity index improving ethylene copolymers, such as copolymers of ethylene and propylene; and ethylene, propylene and diolefin; etc., are reacted or grafted with ethylenically unsaturated carboxylic acid moieties, preferably maleic anhydride moieties, and reacted with polyamines having two or more primary amine groups and a carboxylic acid component, preferably alkylene polyamine and alkenyl succinic anhydride such as polyisobutenyl succinic anhydride. Or the grafted ethylene copolymer can be reacted with already formed salts, amides, imides, etc. of said polyamine and acid component, preferably imides of alkylene polyamine and alkenyl succinic anhydride. These reactions can permit the incorporation of varnish inhibition and dispersancy into the ethylene copolymer while inhibiting cross-linking with resulting viscosity increase, haze or gelling. The aforesaid grafting reaction may be carried out thermally, or more preferably with a free radical initiator such as a peroxide in a mineral lubricating oil, in which case the acid component, preferably also acts to solubilize insoluble compounds formed by side reactions, such as maleic anhydride grafted oil molecules reacted with amine, to thereby inhibit haze formation, particularly when preparing oil concentrates of the V.I.-dispersant additive for later addition to lubricating oils. The invention also includes preferred methods of grafting maleic anhydride onto the ethylene copolymer by periodic or continuous addition of maleic anhydride and initiator charge, so as to maintain the maleic anhydride in solution during the grafting reaction.

33 Claims, No Drawings

ETHYLENE COPOLYMER VISCOSITY INDEX IMPROVER-DISPERSANT ADDITIVE USEFUL IN OIL COMPOSITIONS

BACKGROUND OF THE INVENTION

1. Field of the Invention

The invention relates to polymeric viscosity index (V.I.) improvers—dispersant additives for petroleum oils, particularly lubricating oils. These additives comprise a copolymer of ethylene with one or more $C_3$ to $C_{28}$ alpha-olefins, preferably propylene, which have been grafted with acid moieties, e.g. maleic anhydride, preferably using a free radical initiator, in a solvent, preferably lubricating oil, and then reacted with a mixture of an acid component, preferably an alkenyl succinic anhydride, and a polyamine having two or more primary amine groups. Or the grafted polymer may be reacted with said acid component prereacted with said polyamine to form salts, amides, imides, etc. and then reacted with said grafted olefin polymer. The invention also relates to processes for preparing the preceding products, their use in oil compositions, and includes an improved solution process for grafting acid moieties, e.g. maleic anhydride, onto the ethylene copolymer by staged, or continuous, addition of maleic anhydride and initiator to thereby carry out the graft reaction in the solution stage permitting a high level of grafting while minimizing side reactions.

2. Prior Disclosures

The concept of derivatizing V.I. improving high molecular weight ethylene copolymers, with acid moieties such as maleic anhydride, followed by reaction with an amine to form a V.I.-dispersant oil additive is known in the art as indicated by the following patents.

U.S. Pat. No. 3,316,177 teaches ethylene copolymers such as ethylene-propylene, or ethylene-propylene-diene, which are heated to elevated temperatures in the presence of oxygen so as to oxidize the polymer and cause its reaction with maleic anhydride which is present during the oxidation. The resulting polymer can then be reacted with alkylene polyamines.

U.S. Pat. No. 3,326,804 teaches reacting ethylene copolymers with oxygen or ozone, to form a hydroperoxidized polymer, which is grafted with maleic anhydride followed by reaction with polyalkylene polyamines.

U.S. Pat. No. 4,089,794 teaches grafting the ethylene copolymer with maleic anhydride using peroxide in a lubricating oil solution, wherein the grafting is preferably carried out under nitrogen, followed by reaction with polyamine.

U.S. Pat. No. 4,137,185 teaches reacting $C_1$ to $C_{30}$ mono carboxylic acid anhydrides, and dicarboxylic anhydrides, such as acetic anhydride, succinic anhydride, etc. with an ethylene copolymer reacted with maleic anhydride and a polyalkylene polyamine to inhibit cross linking and viscosity increase due to further reaction of any primary amine groups which were initially unreacted.

U.S. Pat. No. 4,144,181 is similar to 4,137,185 in that it teaches using a sulfonic acid to inactivate the remaining primary amine groups when a maleic anhydride grafted ethylene-propylene copolymer is reacted with a polyamine.

U.S. Pat. No. 4,169,063 reacts an ethylene copolymer in the absence of oxygen and chlorine at temperatures of 150° to 250° C. with maleic anhydride followed by reaction with polyamine.

A number of prior disclosures teach avoiding the use of polyamine having two primary amine groups to thereby reduce cross-linking problems which become more of a problem as the number of amine moieties added to the polymer molecule is increased in order to increase dispersancy.

German Published Application No. P3025274.5 teaches an ethylene copolymer reacted with maleic anhydride in oil using a long chain alkyl hetero or oxygen containing amine.

U.S. Pat. No. 4,132,661 grafts ethylene copolymer, using peroxide and/or air blowing, with maleic anhydride and then reacts with a primary-tertiary diamine.

U.S. Pat. No. 4,160,739 teaches an ethylene copolymer which is grafted, using a free radical technique, with alternating maleic anhydride and a second polymerizable monomer such as methacrylic acid, which materials are reacted with an amine having a single primary, or a single secondary, amine group.

U.S. Pat. No. 4,171,273 reacts an ethylene copolymer with maleic anhydride in the presence of a free radical initiator and then with mixtures of $C_4$ to $C_{12}$ n-alcohol and amine such as N-aminopropylmorpholine or dimethylamino propyl amine to form a V.I.-dispersant-pour depressant additive.

U.S. Pat. No. 4,219,432 teaches maleic anhydride grafted ethylene copolymer reacted with a mixture of an amine having only one primary group together with a second amine having two or more primary groups.

German published application No. 2753569.9 shows an ethylene copolymer reacted with maleic anhydride by a free radical technique and then reacted with an amine having a single primary group.

German published application No. 2845288 grafts maleic anhydride on an ethylene-propylene copolymer by thermal grafting at high temperatures and then reacts with amine having one primary group.

French published application No. 2423530 teaches the thermal reaction of an ethylene copolymer with maleic anhydride at 150° to 210° C. followed by reaction with an amine having one primary or secondary group.

The early patents such as U.S. Pat. Nos. 3,316,177 and 3,326,804 taught the general concept of grafting an ethylene-propylene copolymer with maleic anhydride and then reacting with a polyalkylene polyamine such as polyethylene amines. Subsequently, U.S. Pat. No. 4,089,794 was directed to using an oil solution for free radical peroxide grafting the ethylene copolymer with maleic anhydride and then reacting with the polyamine. This concept had the advantage that by using oil, the entire reaction could be carried out in an oil solution to form an oil concentrate, which is the commercial form in which such additives are sold. This was an advantage over using a volatile solvent for the reactions, which has to be subsequently removed and replaced by oil to form a concentrate. Subsequently, in operating at higher polyamine levels in order to further increase the dispersing effect, increased problems occurred with the unreacted amine groups cross-linking and thereby causing viscosity increase of the oil concentrate during storage and subsequent formation of haze and in some instances gelling. Even though one or more moles of the ethylene polyamine was used per mole of maleic anhydride during imide formation, cross-linking became more of a problem as the nitrogen content of the polymers was increased. One solution was to use the polyamines and then to react the remaining primary amino groups with an acid anhydride, preferably acetic anhydride, of U.S. Pat. No. 4,137,185 or the sulfonic acid of U.S. Pat. No. 4,144,181. The cross-linking problem could also be minimized by avoidance of the ethylene polyamines and instead using amines having one primary group which would react with the maleic anhydride while the other amino groups would be tertiary groups which were substantially unreactive. Patents or published applications showing the use of such primary-tertiary amines noted above are U.S. Pat. No. 4,219,432, wherein a part of the polyamine was replaced with a primary-tertiary amine; U.S. Pat. No. 4,132,661; U.S. Pat. No. 4,160,739; U.S. Pat. No. 4,171,273; German No. P2753569.9; German No. 2,845,288; and French No. 2,423,530.

Still another problem arose when using free radical initiators with mineral oil as the grafting medium is that as the grafting levels were increased to increase the dispersancy level, a larger proportion of the oil molecules in turn became grafted with the maleic anhydride. Then upon subsequent reaction with the amine these grafted oil particles tended to become insoluble and to form haze. To avoid using initiators, such as peroxides, for grafting and to avoid the use of oil, several of the above-noted patents utilized thermal grafting in solvent, preferably while using an ethylene copolymer containing a diene monomer so as to achieve an "ene" type reaction between the unsaturation resulting from the diene moiety and the maleic anhydride. However, generally such "ene" reactions are slower than peroxide grafting.

The present invention represents a further improvement over the art in that it permits the utilization of the generally less expensive polyalkylene polyamines having two primary amine groups, while achieving good dispersancy levels, inhibiting cross-linking and allowing initiator, e.g. peroxide, grafting in oil. The preceding can be obtained by reacting the polymer grafted with the maleic anhydride with an acid component, such as an alkenyl succinic anhydride, together with the polyalkylene polyamine, e.g. polyethyleneamine, or with the reaction product of the acid component and polyalkylene polyamine. In either case cross-linking between ethylene copolymer molecules is reduced or inhibited since many of the polyamine molecules will have one primary group reacted with a maleic anhydride moiety of the ethylene copolymer, while its other primary group is reacted with the acid component. A further advantage is when the grafting is carried out in an oil solution, using a free radical initiator, e.g. a peroxide which is generally much faster with better control, than say depending upon thermal cracking or degradation, oil molecules which become grafted with maleic anhydride and react with the amine, will, to a substantial extent, be solubilized if a long chain acid component is used. Another advantage is that acid component reacted with polyamine which does not become reacted with the grafted ethylene copolymer can be effective per se as a dispersant additive if it has above about 50 carbons, or if it has less than about 50 carbons it may have other properties such as acting as an antirust agent. Thus, long chain acid with more than 50 carbons, usually alkenylsuccinic anhydride, reacted with amine to form oil dispersant additives is well known in U.S. Pat. Nos. 3,154,560; 3,172,892; 3,219,666; etc., while derivatives of acids with less than 50 carbons are taught in U.S. Pat. Nos. 2,466,530; 2,568,876; 2,604,451; 3,004,987; etc.

A further aspect of the present invention is when grafting with a free radical initiator, in solvent or oil, that adding the maleic anhydride and free radical initiator either slowly and continuously over a period of time, or in a series of increments, appears to increase the reaction of the maleic anhydride with the polymer as opposed to undesired side-reactions with oil or solvent molecules. This in turn can permit grafting to higher levels of maleic anhydride without excessive haze.

DESCRIPTION OF PREFERRED EMBODIMENT

Ethylene Copolymer

Oil soluble ethylene copolymers used in the invention generally will have a number average molecular weight ($\overline{M}_n$) of from about 5000 to about 500,000; preferably 10,000 to 200,000 and optimally from about 20,000 to 100,000. In general, polymers useful as V.I. improvers will be used. These V.I. improvers will generally have a narrow range of molecular weight, as determined by the ratio of weight average molecular weight ($\overline{M}_w$) to number average molecular weight ($\overline{M}_n$). Polymers having a $\overline{M}_w/\overline{M}_n$ of less than 10, preferably less than 7, and more preferably 4 or less are most desirable. As used herein ($\overline{M}_n$) and ($\overline{M}_w$) are measured by the well known techniques of vapor phase osmometry (VPO), membrane osmometry and gel permeation chromotography. In general, polymers having a narrow range of molecular weight may be obtained by a choice of synthesis conditions such as choice of principal catalyst and cocatalyst combination, addition of hydrogen during the synthesis, etc. Post synthesis treatment such as extrusion at elevated temperature and under high shear through small orifices, mastication under elevated temperatures, thermal degradation, fractional precipitation from solution, etc. may also be used to obtain narrow ranges of desired molecular weights and to break down higher molecular weight polymer to different molecular weight grades for V.I. use.

These polymers are prepared from ethylene and ethylenically unsaturated hydrocarbons including cyclic, alicyclic and acyclic, containing from 3 to 28 carbons, e.g. 2 to 18 carbons. These ethylene copolymers may contain from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha olefins. While not essential, such copolymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-1-pentene, and 6-methylheptene-1, etc., and mixtures thereof.

The term copolymer as used herein, unless otherwise indicated, includes terpolymers, tetrapolymers, etc., of ethylene, said $C_{3-28}$ alpha-olefin and/or a non-conjugated diolefin or mixtures of such diolefins which may also be used. The amount of the non-conjugated diolefin will generally range from about 0.5 to 20 mole percent, preferably about 1 to about 7 mole percent, based on the total amount of ethylene and alpha-olefin present.

Representative examples of non-conjugated dienes that may be used as the third monomer in the terpolymer include:

a. Straight chain acyclic dienes such as: 1,4-hexadiene; 1,5-heptadiene; 1,6-octadiene.

b. Branched chain acyclic dienes such as: 5-methyl-1,4-hexadiene; 3,7-dimethyl 1,6-octadiene; 3,7-dimethyl 1,7-octadiene; and the mixed isomers of dihydro-myrcene and dihydro-cymene.

c. Single ring alicyclic dienes such as: 1,4-cyclohexadiene; 1,5-cyclooctadiene; 1,5-cyclo-dodecadiene; 4-vinylcyclohexene; 1-allyl, 4-isopropylidene cyclohexane; 3-allyl-cyclopentene; 4-allyl cyclohexene and 1-isopropenyl-4-(4-butenyl)cyclohexane.

d. Multi-single ring alicyclic dienes such as: 4,4'-dicyclopentenyl and 4,4'-dicyclohexenyl dienes.

e. Multi-ring alicyclic fused and bridged ring dienes such as: tetrahydroindene; methyl tetrahydroindene; dicyclopentadiene; bicyclo(2.2.1)hepta 2,5-diene; alkyl, alkenyl, alkylidene, cycloalkenyl and cycloalkylidene norbornenes such as: ethyl norbornene; 5-methylene-6-methyl-2-norbornene; 5-methylene-6, 6-dimethyl-2-norbornene; 5-propenyl-2-norbornene; 5-(3-cyclopentenyl)-2-norbornene and 5-cyclohexylidene-2-norbornene; norbornadiene; etc.

Ethylenically Unsaturated Carboxylic Acid Material

These materials which are grafted (attached) onto the ethylene copolymer contain at least one ethylenic bond and at least one, preferably two, carboxylic acid groups, or an anhydride group, or a polar group which is convertible into said carboxyl groups by oxidation or hydrolysis. Maleic anhydride or a derivative thereof is preferred as it does not appear to homopolymerize appreciable but grafts onto the ethylene copolymer to give two carboxylic acid functionalities. Such preferred materials have the generic formula

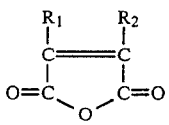

wherein $R_1$ and $R_2$ are hydrogen or a halogen. Suitable examples additionally include chloro-maleic anhydride, itaconic anhydride, or the corresponding dicarboxylic acids, such as maleic acid or fumaric acid or their monoesters, etc.

As taught by U.S. Pat. No. 4,160,739 and U.S. Pat. No. 4,161,452 various unsaturated comonomers may be grafted on the olefin copolymer together with the unsaturated acid component, e.g. maleic anhydride. Such graft monomer systems may comprise one or a mixture of comonomers different from the unsaturated acid component and which contain only one copolymerizable double bond and are copolymerizable with said unsaturated acid component. Typically, such comonomers do not contain free carboxylic acid groups and are esters containing $\alpha,\beta$-ethylenic unsaturation in the acid or alcohol portion; hydrocarbons, both aliphatic and aromatic, containing $\alpha,\beta$-ethylenic unsaturation, such as the $C_4-C_{12}$ alpha olefins, for example isobutylene, hexene, nonene, dodecene, etc.; styrenes, for example styrene, $\alpha$-methyl styrene, p-methyl styrene, p-sec. butyl styrene, etc.; and vinyl monomers, for example vinyl acetate, vinyl chloride, vinyl ketones such as methyl and ethyl vinyl ketone, etc. Comonomers containing functional groups which may cause crosslinking, gelation or other interfering reactions should be avoided, although minor amounts of such comonomers (up to about 10% by weight of the comonomer system) often can be tolerated.

Specific useful copolymerizable comonomers include the following:

(A) Esters of saturated acids and unsaturated alcohols wherein the saturated acids may be monobasic or polybasic acids containing up to about 40 carbon atoms such as the following: acetic, propionic, butyric, valeric, caproic, stearic, oxalic, malonic, succinic, glutaric, adipic, pimelic, suberic, azelaic, sebacic, phthalic, isophthalic, terephthalic, hemimellitic, trimellitic, trimesic and the like, including mixtures. The unsaturated alcohols may be monohydroxy or polyhydroxy alcohols and may contain up to about 40 carbon atoms, such as the following: allyl, methallyl, crotyl, 1-chloroallyl, 2-chloroallyl, cinnamyl, vinyl, methyl vinyl, 1-phenallyl, butenyl, propargyl, 1-cyclohexene-3-ol, oleyl, and the like, including mixtures.

(B) Esters of unsaturated monocarboxylic acids containing up to about 12 carbon atoms such as acrylic, methacrylic and crotonic acid, and an esterifying agent containing up to about 50 carbon atoms, selected from saturated alcohols and alcohol epoxides. The saturated alcohols may preferably contain up to about 40 carbon atoms and include monohydroxy compounds such as: methanol, ethanol, propanol, butanol, 2-ethylhexanol, octanol, dodecanol, cyclohexanol, cyclopentanol, neopentyl alcohol, and benzyl alcohol; and alcohol ethers such as the monomethyl or monobutyl ethers of ethylene or propylene glycol, and the like, including mixtures. The alcohol epoxides include fatty alcohol epoxides, glycidol, and various derivatives of alkylene oxides, epichlorohydrin, and the like, including mixtures.

The components of the graft copolymerizable system are used in a ratio of unsaturated acid monomer component to comonomer component of about 1:4 to 4:1, preferably about 12 to 2:1 by weight.

Grafting of the Ethylene Copolymer

The grafting of the ethylene copolymer with the carboxylic acid material may be by any suitable method, such as thermally by the "ene" reaction, using copolymers containing unsaturation, such as ethylene-propylene-diene polymers either chlorinated or unchlorinated, or more preferably it is by free-radical induced grafting in solvent, preferably in a mineral lubricating oil as solvent.

The radical grafting is preferably carried out using free radical initiators such as peroxides, hydroperoxides, and azo compounds and preferably those which have a boiling point greater than about 100° C. and which decompose thermally within the grafting temperature range to provide said free radicals. Representative of these free-radical initiators are azobutyro-nitrile, 2,5-dimethyl-hex-3-yne-2, 5 bis-tertiary-butyl peroxide (sold as Lupersol 130) or its hexane analogue, di-tertiary butyl peroxide and dicumyl peroxide. The initiator is generally used at a level of between about 0.005% and about 1%, based on the total weight of the polymer solution, and temperatures of about 150° to 220° C.

The ethylenically unsaturated carboxylic acid material, preferably maleic anhydride, will be generally used in an amount ranging from about 0.01% to about 10%, preferably 0.1 to 2.0%, based on weight of the initial total solution. The aforesaid carboxylic acid material and free radical initiator are generally used in a weight percent ratio range of 1.0:1 to 30:1, preferably 3.0:1 to 6:1.

The initiator grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. The grafting time will usually range from about 0.1 to 12 hours, preferably from about 0.5 to 6 hours, more preferably 0.5 to 3 hours. The graft reaction will be usually carried out to at least approximately 4 times, preferably at least about 6 times the half-life of the free-radical initiator at the reaction temperature employed, e.g. with 2,5-dimethyl hex-3-yne-2, 5-bis(t-butyl peroxide) 2 hours at 160° C. and one hour at 170° C., etc.

In the grafting process, usually the copolymer solution is first heated to grafting temperature and thereafter said unsaturated carboxylic acid material and initiator are added with agitation, although they could have been added prior to heating. When the reaction is complete, the excess acid material can be eliminated by an inert gas purge, e.g. nitrogen sparging. Preferably the carboxylic acid material that is added is kept below its solubility limit in the polymer solution, e.g. below about 1 wt. %, preferably below 0.4 wt. % or less, of free maleic anhydride based on the total weight of polymer-solvent solution, e.g. ethylene copolymer-mineral lubricating oil solution. Continuous or periodic addition of the carboxylic acid material along with an appropriate portion of initiator, during the course of the reaction, can be utilized to maintain the carboxylic acid below its solubility limits, while still obtaining the desired degree of total grafting.

In the initiator grafting step the maleic anhydride or other carboxylic acid material used will be grafted onto both the polymer and the solvent for the reaction. Many solvents such as dichlorobenzene are relatively inert and may be only slightly grafted, while mineral oil will tend to be more grafted. The exact split of graft between the substrate present depends upon the polymer and its reactivity, the reactivity and type of oil, the concentration of the polymer in the oil, and also upon the maintenance of the carboxylic acid material in solution during the course of the reaction and minimizing the presence of dispersed, but undissolved acid, e.g. the maleic anhydride. The undissolved acid material appears to have an increased tendency to react to form oil insoluble materials as opposed to dissolved acid material. The split between grafted oil and grafted polymer may be measured empirically from the infrared analyses of the product dialyzed into oil and polymer fractions.

The grafting is preferably carried out in a mineral lubricating oil which need not be removed after the grafting step but can be used as the solvent in the subsequent reaction of the graft polymer with the amine material and as a solvent for the end product to form the lubricating additive concentrate. The oil having attached, grafted carboxyl groups, when reacted with the amine material will also be converted to the corresponding derivatives.

The solution grafting step when carried out in the presence of a high temperature decomposable peroxide can be accomplished without substantial degradation of the chain length (molecular weight) of the ethylene-containing polymer. This can be an advantage as opposed to high temperature thermal reactions which depend on degradation to apparently form free radical reactive sites. Measurement of molecular weights and degradation can be evaluated by determination of the thickening efficiency (T.E.) of the polymer as will later be described.

The Amines

The amine component will have two or more primary amine groups, wherein the primary amine groups may be unreacted, or wherein one of the amine groups may already be reacted.

Particularly preferred amine compounds have the following formulas:

(A) alkylene polyamines

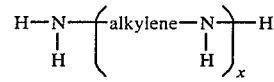

wherein x is an integer of about 1 to 10, preferably about 2 to 7, and the alkylene radical is a straight or branched chain alkylene radical having 2 to 7, preferably about 2 to 4 carbon atoms;

(B) polyoxyalkylene polyamines

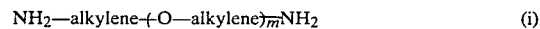

where m has a value of about 3 to 70 and preferably 10 to 35; and

where n has a value of about 1 to 40 with the provision that the sum of all the n's is from about 3 to about 70 and preferably from about 6 to about 35 and R is a polyvalent saturated hydrocarbon radical of up to ten carbon atoms having a valence of 3 to 6. The alkylene groups in either formula (i) or (ii) may be straight or branched chains containing about 2 to 7, and preferably about 2 to 4 carbon atoms.

Examples of the alkylene polyamines of formula (A) above include methylene amines, ethylene amines, butylene amines, propylene amines, pentylene amines, hexylene amines, heptylene amines, octylene amines, other polymethylene amines, the cyclic and higher homologs of these amines such as the piperazines, the amino-alkyl-substituted piperazines, etc. These amines include, for example, ethylene diamine, diethylene triamine, triethylene tetramine, propylene diamine, di(heptamethylene)triamine, tripropylene tetramine, tetraethylene pentamine, trimethylene diamine, pentaethylene hexamine, di(trimethylene)triamine, 2-heptyl-3-(2-aminopropyl)imidazoline, 4-methylimidazoline, 1,3-bis-(2-aminoethyl)imidazoline, pyrimidine, 1-(2-aminopropyl)piperazine, 1,4-bis-(2-aminoethyl)piperazine, N,N-dimethyaminopropyl amine, N,N-dioctylethyl amine, N-octyl-N'-methylethylene diamine, 2-methyl-1-(2-aminobutyl)piperazine, etc. Other higher homologs which may be used can be obtained by condensing two or more of the above-mentioned alkylene amines in a known manner.

The ethylene amines which are particularly useful are described, for example, in the Encyclopedia of Chemical Technology under the heading of "Ethylene Amines" (Kirk and Othmer), Volume 5, pgs. 898–905;

Interscience Publishers, New York (1950). These compounds are prepared by the reaction of an alkylene chloride with ammonia. This results in the production of a complex mixture of alkylene amines, including cyclic condensation products such as piperazines. While mixtures of these amines may be used for purposes of this invention, it is obvious that pure alkylene amines may be used with complete satisfaction.

The polyoxyalkylene polyamines of formula (B) above, preferably polyoxyalkylene diamines and polyoxyalkylene triamines, may have average molecular weights ranging from about 200 to about 4000 and preferably from about 400 to about 2000. The preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

The Acid Component

The acid component includes: hydrocarbyl substituted succinic anhydride or acid having 12 to 49 carbons, preferably 16 to 49 carbons in said hydrocarbyl group; long chain monocarboxylic acid of the formula RCOOH where R is a hydrocarbyl group of 50 to 400 carbons and long chain hydrocarbyl substituted succinic anhydride or acid having 50 to 400 carbons in said hydrocarbyl group. Said hydrocarbyl groups are essentially aliphatic and include alkenyl and alkyl groups. The longer chain acids and anhydrides are preferred, particularly when the grafting reaction is carried out in lubricating oil because of ability to impart dispersancy to reacted oil molecules as well as their greater solubilizing effect.

Primarily because of its ready availability and low cost, the hydrocarbyl portion, e.g. alkenyl groups, of the carboxylic acid or anhydride is preferably derived from a polymer of a $C_2$ to $C_5$ monoolefin, said polymer generally having a molecular weight of about 140 to 6500, e.g. 700 to about 5000, most preferably 700 to 3000 molecular weight. Particularly preferred is polyisobutylene.

Pre-Reacted Amine-Acid Component

The aforesaid amine and acid component may be prereacted, with the acid being generally attached to the amine through salt, imide, amide, amidine, ester, or other linkages so that a primary amine group of the polyamine is still available for reaction with the acid moieties of the grafted polymer. A convenient source of these prereacted materials are the well-known lubricating oil dispersants, provided they retain primary amine groups capable of further reaction with the grafted polymer.

Usually, these dispersants are made by condensing a hydrocarbyl substituted monocarboxylic acid or a dicarboxylic acid, having about 50 to 400 carbons in the hydrocarbyl substituent, as described above under "The Acid Component", preferably a succinic acid producing material such as alkenyl succinic anhydride, with an amine or polyamine, including those described above under "The Amines".

Monocarboxylic acid dispersants have been described in U.K. Patent Specification No. 983,040. Here, polyamines are reacted with the high molecular weight monocarboxylic acid derived from a polyolefin, such as polyisobutylene, by oxidation with nitric acid or oxygen; or by addition of halogen to the polyolefin followed by hydrolyzing and oxidation; etc. Another method is taught in Belgian Pat. No. 658,236 where polyolefin, such as the polymers of $C_2$ to $C_5$ monoolefin, e.g. polypropylene or polyisobutylene, is halogenated, e.g. chlorinated, and then condensed with an alpha, beta-unsaturated, monocarboxylic acid of from 3 to 8, preferably 3 to 4, carbon atoms, e.g. acrylic acid, alpha-methyl-acrylic acid, i.e., 2-methyl propenoic acid, crotonic acid, etc., and then reacted with polyamine.

Formation of dicarboxylic acid dispersant by reaction of an amine with alkenyl succinic anhydride prepared from the reaction of a polyolefin or chlorinated polyolefin and maleic anhydride, etc. is well known in the art, as seen in U.S. Pat. No. 3,272,746.

Most preferred are the lubricating oil dispersants made by reaction of the aforesaid "(A) alkylene polyamines" previously described, with alkenyl succinic anhydride.

Reaction, preferably amination and/or imidation of the carboxylic acid material is usefully done as a solution reaction with the acid material, usually polyisobutenylsuccinic anhydride, dissolved in a solvent such as mineral oil, to which the other reactant is added. The formation of the dispersants in high yield can be effected by adding from about 0.5 to 3.3, preferably about 0.7 to 1.3, most preferably about 1 to 1 molar proportions of the alkylene polyamine per molar proportion of alkenyl succinic anhydride to said solution and heating the mixture at 140° C. to 165° C. or higher until the appropriate amount of water of reaction is evolved. Typically the mineral oil solvent is adjusted so that it constitutes 50% by weight of the final acyl nitrogen compound solution.

Reaction of Grafted Ethylene Copolymer with Amine and Acid Component

The grafted polymer, preferably in solution generally equal to about 5 to 30 wt. %, preferably 10 to 20 wt. % polymer, can be readily reacted with a mixture of amine and acid components, or with said pre-reacted amine and acid, by admixture together with said grafted polymer and heating at a temperature of from about 100° C. to 250° C., preferably from 170° to 230° C., for from about 1 to 10 hours, usually about 2 to about 6 hours. The heating is preferably carried out to favor formation of imides rather than amides and salts. Thus, imide formation will give a lower viscosity of the reaction mixture than amide formation and particularly lower than salt formation. This lower viscosity permits the utilization of a higher concentration of grafted ethylene copolymer in the reaction mixture. Removal of water assures completion of the imidation reaction. Reaction ratios can vary considerably, depending upon the reactants, amounts of excess, type of bonds formed, etc. Generally from about 1 to 2, preferably about 1 mole of said bi-primary amine, and about 1 to 4, preferably about 1.5 to 3, most preferably about 2 mole equivalent of said acid component (e.g. 2 moles of monocarboxylic or 1 mole of dicarboxylic acid component), is preferably used, per mole of the grafted dicarboxylic acid moiety content, e.g. grafted maleic anhydride content. Alternatively, if pre-reacted amine and acid component is used, such as a dispersant, sufficient dispersant is used to give about 1 to 2 primary amine groups per dicarboxylic acid moiety in the grafted polymer, depending on whether primarily imides or amides are formed. Usually 1 to 2 moles of said dispersant is used per molar amount of said dicarboxylic acid moieties in the grafted polymer. For example, with an ethylene-propylene copolymer of about 40,000 ($\overline{M}_n$), i.e. a thickening efficiency of about 2.1, and averaging 4 maleic anhydride groups per molecule, and making imides, about 4 moles of amine with two primary groups and about 4 moles of alkenyl succinic anhydride would preferably be used per mole of grafted copolymer.

A minor amount, e.g. 0.001 up to 50 wt. %, preferably 0.005 to 25 wt. %, based on the weight of the total composition, of the oil-soluble nitrogen-containing graft ethylene copolymers produced in accordance with this invention can be incorporated into a major amount of an oleaginous material, such as a lubricating oil or hydrocarbon fuel, depending upon whether one is forming finished products or additive concentrates. When used in lubricating oil compositions, e.g., automotive or diesel crankcase lubricating oil, the nitrogen-containing grafted polymer concentrations are usually within the range of about 0.01 to 10 wt. %, e.g., 0.1 to 6.0 wt. %, preferably 0.25 to 3.0 wt. %, of the total composition. The lubricating oils to which the products of this invention can be added include not only hydrocarbon oil derived from petroleum, but also include synthetic lubricating oils such as esters of dibasic acids; complex esters made by esterification of monobasic acids, polyglycols, dibasic acids and alcohols; polyolefin oils, etc.

The nitrogen-containing graft polymers of the invention may be utilized in a concentrate form, e.g., from about 5 wt. % up to about 50 wt. %, preferably 7 to 25 wt. %, in oil, e.g., mineral lubricating oil, for ease of handling, and may be prepared in this form by carrying out the reaction of the invention in oil as previously discussed.

The above oil compositions may contain other conventional additives, such as dyes, pour point depressants, antiwear agents, antioxidants, other viscosity-index improvers, dispersants, etc.

The following examples, which include preferred embodiments, further illustrate the present invention.

EXAMPLE 1

Part A

Ethylene-propylene copolymer grafted with maleic anhydride in an oil solution was prepared in a reaction flask equipped with a stirrer, thermometer, dropping funnel, nitrogen inlet so as to maintain a nitrogen blanket, an overhead condenser and water trap. The preparation was carried out by dissolving 96 grams of ethylene-propylene copolymer in 1104 grams of Solvent 100 Neutral (S100N), which is a mineral lubricating oil having a viscosity of about 100 SUS at 37.8° C., in said reactor by warming to about 100° C. under a nitrogen blanket. Then 14.4 grams of maleic anhydride and 3.6 grams of ditertiary butyl peroxide as a free radical initiator were added and the reaction mixture was further heated with stirring to 190° C. and maintained at this temperature for about one-half hour, followed by nitrogen stripping for another one-half hour to remove volatiles and then followed by cooling to give the oil solution of the grafted polymer. The ethylene-propylene copolymer was a V.I. improver and consisted of about 43 wt. % ethylene and about 57 wt. % propylene and had a T.E. (thickening efficiency) of about 2.8 which represents a number average molecular weight of approximately 60,000. It was an amorphous copolymer with a $\overline{M}_w/\overline{M}_n$ of less than 4.

Thickening efficiency (T.E.) is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.4 centistokes at 98.9° C., to the weight percent of a test copolymer required to thicken the same oil to the same viscosity at the same temperature. T.E. is related to ($\overline{M}_n$) and is a convenient, useful measurement for formulation of lubricating oils of various grades.

Part B

An imide reaction product of octadecenyl succinic anhydride with diethylene triamine in a mole ratio of about 1.3 to 1, was prepared by reacting 200 grams (0.57 moles) of octadecenyl succinic anhydride, wherein the octadecenyl group was a straight chain $C_{18}$ group, and 45.27 grams (0.44 moles) of diethylene triamine in a reaction flask by mixing and heating to 190° C. with the removal of water by nitrogen stripping for about 1½ hours with the recovery of about 10 grams of water (0.55 moles), followed by cooling to give the imide.

Part C 1100 grams of the product of Part A, namely the ethylene-propylene copolymer grafted with maleic anhydride in a diluent oil, having an acidity equivalent to 0.1039 meq./g. (milliequivalents per gram) were added to the reaction flask and heated to 210° C. Then 57.4 grams of the imide product of Part B were added, and the temperature maintained at 210° C. for one-half hour, followed by blowing nitrogen through the reaction mixture in order to strip the product of water and other volatiles, followed by cooling to form the final product.

Haze Test

The final product of Part C was tested for haze in 10W50 crankcase motor oil formulation. The formulation was prepared by adding 5.69 grams of an additive package of conventional additives comprising a polyisobutenyl succinic anhydride reacted with polyethylene amine and then borated as an ashless dispersant, a 400 TBN (Total Base Number) magnesium sulfonate and a 250 TBN calcium phenate as metal detergents, a zinc dialkyl dithiophosphate as a anti-wear, antioxidant additive, an ashless antioxidant and a pour depressant, to 76.61 grams of a S150N oil (Solvent Neutral lubricating oil having a viscosity of about 150 SUS at 37.8° C.). To this were added 17.6 g. of the final reaction product of Part C, sufficient to form a 10W50 oil, which mixture was then tested for haze using a Nephocolorimeter, Model #9, sold by the Coleman Instrument Corporation, Maywood, Ill. The haze reading was 27.8 nephelos, which was a very satisfactory reading since above about 75 nephelos the haze becomes visible.

EXAMPLE 2

Part A 400 grams of an oil concentrate of 70 wt. % polyisobutenyl succinic anhydride in 30 wt. % of a lubricating oil diluent having an ASTM Saponification No. of 70 were added to the reaction flask with 768 grams of Solvent 150 Neutral, and warmed to 150° C. with mixing. Then 19.81 grams of diethylene triamine (molecular weight of 103) were added to the flask, following which the heated mixture was stripped by nitrogen sparging for about one-half hour at 150° C. This was followed by cooling to room temperature to give an oil solution of an ashless dispersant additive having a nitrogen content of 0.69 wt. % based on the weight of the solution. The polyisobutenyl succinic anhydride was prepared from polyisobutylene having a molecular weight of about 900 reacted with maleic anhydride by heating.

Part B 700 grams of oil concentrate containing about 15 wt. % of ethylene-propylene copolymer grafted with maleic anhydride, having an acidity of about 0.130 meq./gram, were added to the reactor together with 1400 grams of Solvent 150 Neutral oil and heated to 150° C. with stirring in order to form an oil solution containing about 5 wt. % of the grafted ethylene-propylene copolymer. The oil solution of 15% grafted ethylene-propylene copolymer was part of a larger batch, which was prepared as follows, wherein all parts are by weight:

An oil concentrate (555 parts) of about 15% ethylene-propylene copolymer (2.1 TE) which was a V.I. improving amorphous ethylene copolymer with $M_w/M_n$ less than 4, containing about 43 wt. % ethylene and about 57 wt. % propylene, was charged into a reactor, heated to about 190° C. under nitrogen and sparged (nitrogen) for 1 hr. Maleic anhydride (8 parts); and di-butyl peroxide (1.98 parts) diluted with oil (2.15 parts); were added to the stirred reactor and stirring continued for 0.5 hr. After the reaction was sparged with nitrogen for 1.5 hrs. to remove any unreacted maleic anhydride, the oil solution of grafted ethylene copolymer was recovered.

Part C (I) The 2100 grams of the 5 wt. % concentrate product of Part B were heated to 150° C. in the reactor, at which temperature 1,049 grams of the oil solution (25 wt. % active ingredient) of the polyisobutenyl succinic anhydride-diethylene triamine reaction product of Part A were slowly added over about 30 minutes to the flask while maintaining the temperature at about 150° C., and under nitrogen. The mixture was nitrogen sparged for one-half hour while stirring at 150° C., and then cooled to form a final product, which analyzed 0.29 wt. % nitrogen for the oil solution.

(II) A 200 gram portion of the product of Part C (I), which had a viscosity of about 162 centistokes at 100° C. was further heat treated by heating to 190° C., which temperature was maintained for one hour, then raised to 200° C. for one hour, then raised to 210° C. for another hour, then raised to 220° C. for another hour, and then cooled. In other words, after the initial heating to 190° C., then over a period of four hours, the temperature was raised from 190° to 220° C. by increments of about 10° every hour. After this heating, the viscosity at 100° C. dropped from 162 to 78.6 centistokes, indicating that a further reaction, apparently driving out more water since there was an indication that traces of water had collected in the overhead condenser, had occurred.

The preceding illustrates the importance of heating in obtaining the desired degree of reaction and in controlling the viscosity and T.E. effect of the product.

Sludge Inhibition Bench (SIB) Test

The efficacy of the derivatized copolymers of this invention as dispersants in lubricating oil is illustrated in a Sludge Inhibition Bench (SIB) Test. The SIB Test has been found, after a large number of evaluations, to be an excellent test for assessing the dispersing power of lubricating oil dispersant additives.

The medium chosen for the SIB Test was a used crankcase mineral lubricating oil composition having an original viscosity of about 325 SUS at 38° C. that had been used in a taxicab that was driven generally for short trips only, thereby causing a buildup of a high concentration of sludge precursors. The oil that was used contained only a refined base mineral lubricating oil, a viscosity index improver, a pour point depressant and zinc dialkyldithiophosphate anti-wear additive. The oil contained no sludge dispersant. A quantity of such used oil was acquired by draining and refilling the taxicab crankcase at 1000–2000 mile intervals.

The Sludge Inhibition Bench Test is conducted in the following manner: The aforesaid used crankcase oil, which is milky brown in color, is freed of sludge by centrifuging for one hour at about 39,000 gravities (gs.). The resulting clear bright red supernatant oil is then decanted from the insoluble sludge particles thereby separated out. However, the supernatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil, a small amount, such as 0.5, 1 or 2 weight percent, of the particular additive being tested. Ten grams of each blend being tested are placed in a stainless steel centrifuge tube and are heated at 135° C. for 16 hours in the presence of air. Following the heating, the tube containing the oil being tested is cooled and then centrifuged for about 30 minutes at room temperature at about 39,000 gs. Any deposits of new sludge that form in this step are separated from the oil by decanting the supernatant oil and then carefully washing the sludge deposits with 25 ml of heptane to remove all remaining oil from the sludge and further centrifuging. The weight of the new solid sludge that has been formed in the test, in milligrams, is determined by drying the residue and weighing it. The results are reported as amount of precipitated sludge in comparison with the precipitated sludge of a blank not containing any additional additive, which blank is normalized to a rating of 10. The less new sludge precipitated in the presence of the additive, the lower the SIB value and the more effective is the additive as a sludge dispersant. In other words, if the additive gives half as much precipitated sludge as the blank, then it would be rated 5.0 since the blank will be normalized to 10.

Varnish Inhibition Bench Test (VIB)

A laboratory test was used to determine varnish inhibition. Here, each test sample consisted of 10 grams of lubricating oil containing a small amount of the additive being tested. The test oil to which the additive is admixed is of the same type as used in the above-described SIB Test. Each ten gram sample was heat soaked overnight at about 140° C. and thereafter centrifuged to remove the sludge. The supernatant fluid of each sample was subjected to heat cycling from about 150° C. to room temperature over a period of 3.5 hours at a frequency of about 2 cycles per minute. During the heating phase, gas which was a mixture of about 0.7 volume percent SO₂, 1.4 volume percent NO and balance air was bubbled through the test samples. During the cooling phase water vapor was bubbled through the test samples. At the end of the test period, which testing cycle can be repeated as necessary to determine the inhibiting effect of any additive, the wall surfaces of the test flasks in which the samples were contained are visually evaluated as to the varnish inhibition. The amount of varnish imposed on the walls is rated to values of from 1 to 11 with the higher number being the greater amount of varnish, in comparison with a blank with no additive that was rated 11.

10.00 grams of SIB Test oil (Test Oil 1) were mixed with 0.08 grams of the product of C(I) and tested in the afore-described SIB and VIB tests.

10.0 grams of SIB Test oil (Test Oil 2) from a different taxicab were mixed with 0.10 grams of the product of C(II) and tested in the aforedescribed SIB and VIB tests.

For comparison, 10.0 grams of Test Oils 1 and 2 were respectively mixed with 0.05 grams of a conventional sludge dispersant which is an oil concentrate of about 50 wt. % of active ingredient (a.i.) formed by reacting polyisobutenylsuccinic anhydride with polyethylene amine, then borating.

The test results are summarized below in Table I.

TABLE I

| Test Oil | Additive | SIB | VIB |
|---|---|---|---|
| 1 | None | 10 | 11 |
| 1 | +0.8 wt. % (11.6% a.i.) Example 2 C(I) | 8.3 | 6½ |
| 1 | +0.5 wt. % (50% a.i.) Sludge Dispersant | 7.8 | 7 |
| 2 | None | 10 | 11 |
| 2 | +1.0 wt. % (11.6% a.i.) Example 2 C(II) | 9.81 | 7 |
| 2 | +0.5 wt. % (50% a.i.) Sludge Dispersant | 3.63 | 7 |

As shown by the above test data, additives 2C(I) and 2C(II) gave good results in varnish inhibition and had dispersing ability when compared to a conventional sludge dispersant.

In contrast to the small scale preparation of Example 1, in larger scale preparations the problem of haze appeared more acute. Here it was found particularly advantageous to carry out the maleic anhydride and peroxide addition in a series of steps as will be illustrated by the following Examples 3 to 5.

EXAMPLE 3

166 pounds of an oil solution containing about 19.9 pounds of the ethylene-propylene copolymer used in Example 1 having a T.E. of about 2.8 and consisting of about 43 wt. % ethylene and about 57 wt. % propylene, dissolved in 146.1 pounds of a mineral lubricating oil diluent were charged to a reactor along with 13.5 pounds of Solvent 100 Neutral Oil. The reactor was a small heated kettle equipped with a charging line, stirrer, overhead water condenser, vacuum pump which gives a pressure of about 10 Kpa and a nitrogen inlet in order to maintain a nitrogen atmosphere. After stirring under nitrogen and vacuum for about 1¾ hrs to remove moisture, the reactor was heated to 190° C. and 2.68 pounds of molten maleic anhydride were added to the reactor through the charging line, followed by the addition of about 0.74 pounds of Solvent 100 Neutral to flush the charging inlet. Next 0.36 pounds of ditertiary butyl peroxide dissolved in 0.36 pounds of Solvent 100 Neutral (S100N) oil were added to the reactor through the charging line over about a 13 minute period followed by flushing of said line with 0.52 pounds of additional S100N oil. Vacuum was applied to the reactor while nitrogen stripping over a period of about one hour while maintaining the kettle temperature at about 190° to 195° C. A small sample of the reactor product was then titrated and had an acidity, due to the grafted maleic anhydride, of 0.11 meq./gram. Next, 18.5 pounds of polyisobutenyl succinic anhydride having an ASTM D-64 Sap. No. of 112, and wherein the polyisobutenyl group had a number average mol. weight of about 900, dissolved in 54.5 pounds of the aforesaid S100N diluent oil were added to the reactor. Then 1.96 pounds of diethylene triamine (DETA) were slowly added to the reactor over a period of about 43 minutes followed by the addition of 0.60 pounds of oil as a flush for the charging line. When all the amine had been added, nitrogen stripping was carried out for three hours, while maintaining the 190°–195° C. temperature, followed by cooling and draining to give the product.

EXAMPLE 4

185 pounds of the oil solution containing the ethylene-propylene copolymer as defined above in Example 3, were added to the reactor along with 15 pounds of additional S100N solvent diluent oil, followed by heating to 190° C. under vacuum with a nitrogen sparge over about two hours and ten minutes to remove moisture. At the end of the vacuum stripping, a first stage addition of 1.5 pounds of maleic anhydride followed by S100N diluent oil as a flush were added to the kettle, followed by the addition of 0.2 pounds of ditertiary butyl peroxide dissolved in 0.2 pounds of said oil over a period of about ten minutes, which was followed by another oil flush. After this, a second stage addition, exactly like the first stage, was carried out, namely another 1.5 pounds of maleic anhydride followed by flush oil were added to the reactor, and again over ten minutes 0.2 pounds of the ditertiary butyl peroxide dissolved in 0.2 parts of said oil were added to the reactor, followed by an oil flush. A total of 0.78 pounds of oil were added to the kettle by said flushes. The vacuum was turned on with nitrogen stripping, while still at a temperature of 190° C., for another hour after which the vacuum and nitrogen stripping were ended. A sample of the reactor contents showed an acidity of 0.1218 meq./gram. Next 20.47 pounds of polyisobutenyl succinic anhydride (same as in Example 3) and 60.2 pounds of the S100N diluent oil were added to the kettle while mixing. Then 2.28 pounds of diethylene triamine, sufficient to neutralize both the maleic anhydride grafted ethylene-propylene copolymer and the polyisobutenyl succinic anhydride through its primary amine groups, were added over a 45-minute period following which the nitrogen sparging, heating and stirring was maintained for another 2½ hours, after which the reactor was drained and the product recovered.

EXAMPLE 5

This was carried out in a manner generally similar to the preceding Examples 3 and 4 except the maleic anhydride and peroxide were added in four stages or steps. Specifically, the reactor was charged with 185 pounds of the ethylene-propylene copolymer-oil solution and 15 pounds of S100N as additional diluent oil. The mixture was heated to 190° C. under a nitrogen sparge for about one hour in order to remove any moisture that might be present in either the oil or copolymer. Then the maleic anhydride and peroxide were added in four stages, each of equal increments. Thus, in a first stage, 0.75 pounds of maleic anhydride were added to the reactor followed by the oil flush, then followed by the addition of 0.18 pounds of the ditertiary butyl peroxide dissolved in 0.18 pounds of said oil over a 10 minute period, followed by more flush oil. This procedure was repeated three more times, for a total of four stages or series of additions, each of 0.75 pounds of maleic anhydride rapidly added to the reactor followed by the slower addition over a 10 minute period of the oil solution of 0.18 pounds of ditertiary butyl peroxide in 0.18 pounds of oil. After each addition of maleic anhydride and the oil solution of ditertiary butyl peroxide, the inlet lines were flushed with S100N oil, using a total of 1.59 pounds of said oil in said flushes. Following the last addition, vacuum stripping was carried out over a one hour period. A sample of the reactor contents had an acidity of 0.1271 meq./gram. To the reactor were then added 20.35 pounds of the aforesaid polyisobutenyl succinic anhydride and 59.85 pounds of the S100N oil. After the addition and mixing in of the polyisobutenyl succinic anhydride, then 2.33 pounds of diethylene triamine were added over a 45 minute period with nitrogen sparging, followed by a three hour nitrogen stripping under vacuum, after which the contents of the reactor were cooled and drained.

The products of Examples 3, 4 and 5 described above were mixed with 5.69 grams of the additive package of Example 1 and S150N lubricating oil to form a 10W50 oil and then tested for haze as described in Example 1. The results are summarized in the following Table II.

TABLE II

| Grams, Product | Grams, S150N | Grams Add. Package | Haze |
|---|---|---|---|
| 15.39 g. Example 3 | 78.92 | 5.69 | 120 |
| 14.85 g. Example 4 | 79.46 | 5.69 | 67 |
| 15.54 g. Example 5 | 78.77 | 5.69 | 47 |

The haze reading above showed the product of Example 3 gave a haze reading of about 120 nephelos, Example 4 product gave a haze reading of about 67 and the material of Example 5 gave a haze reading of about 47, at about the same concentrations. This indicates that when grafting to a high maleic anhydride level, then adding the maleic anhydride and the peroxide initiator in a series of stages can improve the product. This improvement is believed related to avoiding undissolved maleic anhydride. Apparently keeping the unreacted maleic anhydride at low concentrations to maintain it in solution, e.g. less than about 0.4 wt. % maleic anhydride present as in Example 5, based on the weight of polymer-mineral oil, the reaction of the maleic anhydride onto oil molecules is substantially reduced since the haze caused by the oil grafted molecules later reacting with amine to form insoluble haze products is substantially reduced.

EXAMPLE 6

Following the general procedure of Example 5 described above, 40 pounds of the ethylene-propylene copolymer V.I. improver and 160 pounds of a low pour (LP) point grade of S100N mineral oil were added to the reactor and heated to 190° C., while stirring and sparging with nitrogen for about one hour. This was followed by the addition, over four equal stages over about a one hour period as in Example 5, of a total of 3.40 pounds of maleic anhydride and a charge of 0.85 pounds of the ditertiary butyl peroxide dissolved in 0.85 pounds of the mineral oil, using S100N LP oil as the flush oil after each maleic anhydride and after each peroxide/oil addition, for a total of 1.63 pounds of oil. Then after about one hour of stripping, 29.40 pounds of the polyisobutenyl succinic anhydride (PIBSA) with a Sap. No. of 112 dissolved in 20.70 pounds of the oil were added to the reactor. Then 2.95 pounds of diethylene triamine (DETA) was added followed by a flush of 0.76 pounds of oil. The reaction was finished by stirring at 190° C. for three hours while nitrogen stripping after which the contents of the reactor were cooled and drained.

EXAMPLES 7 TO 11

Examples 7 to 8 were carried out in the general manner as Example 6, but with different proportions of reactants, different stages of addition, etc. Examples 9 to 11 were also similar, but in addition used sulfonic acid as a final treat at the end of the reaction along with the addition of flush oil after the sulfonic acid addition and extra oil. The sulfonic acid was added as a 50 wt. % solution of a $C_{24}$ average alkyl benzene sulfonic acid having a number average molecular weight of about 500 to 50 wt. % mineral oil diluent. This material was added after the nitrogen stripping while the reaction mixture was still at about 190° C., followed by additional stirring for about another 15 minutes before cooling. Examples 9 to 11 used sulfonic acid as a further stabilizing additive to react with any remaining primary amine groups, in accord with the teaching of U.S. Pat. No. 4,144,181.

The above compositions were tested in an SAE 10W40 formulation crankcase motor oil composition using a formulation containing mineral lubricating oil plus 1.3 wt. % (active ingredient) of the inventive polymer. The oil also contained 4.3 wt. % of a detergent inhibitor package of conventional additives used to impart rust and oxidation inhibition to the oil. As a control, the same formulation was prepared but using the ethylene-propylene copolymer V.I. improver per se.

The oil formulations were tested in a Caterpillar 1-H2 test (Federal Test Method 346, Feb. 15, 1977). This test uses a single cylinder diesel engine having 134 cubic inch displacement, a precombustion chamber, a compression ratio of 16.4 to 1. After one hour break-in the test is carried out for 480 hours at a operating speed of 1800 rpm., a fuel flow of 495 Btu's per minute, oil temperature of 180° F., coolant temperature of 160° F., air temperature of 170° F., absolute temperature of 1050° F. and an air pressure of 40 inches of mercury absolute. During the test, the oil is changed every 120 hours. However, the test was modified by running only to 120 hours instead of the normal 480 hours. Following the test the engine is examined for the effect of the crankcase oil on piston deposits and rated on a Total Weighted Demerit (TWD) scale of 1000+ to 0 where zero is clean with no stain. The procedure simulates high speed, moderately supercharged engine operation. The TWD rating reflects the carbon and lacquer deposits in the piston ring grooves and on the piston surface between the rings. Both types of deposits (carbon or lacquer) as well as the area covered enter into the calculation of TWD.

In addition to the above, an MS Sequence VD test (ASTM STP 315F) was carried out. This test is designed to evaluate the sludge and varnish performance of crankcase oils under cycles of test conditions which simulate stop-and-go city driving and moderate turnpike operation. This test is carried out in a 1980 model Ford 2.3 L four-cylinder engine over a 192 hour test period. The sludge and varnish results are reported as merit ratings where 10 denotes a clean part and 0 the maximum possible deposit formation.

The compositions prepared and their effectiveness in the preceding tests are summarized in the following Tables III and IV.

TABLE III

| | Composition | | | | | |
|---|---|---|---|---|---|---|
| | Examples | | | | | |
| Composition, Lbs. | 6 | 7 | 8 | 9 | 10 | 11 |
| Ethylene-Propylene (EP) Copolymer | 40 | 30 | 24.9 | 40 | 30 | 27 |
| S100N LP Oil | 160 | 170 | 181.1 | 160 | 170 | 176 |
| Maleic Anhydride, charged | 3.40 | 2.40 | 2.46 | 2.25 | 2.8 | 2.25 |
| Di-t-butyl peroxide/oil | .85/.85 | .60/60 | .61/61 | .56/.56 | .7/.7 | .56/.56 |
| Flush Oil | 1.63 | .20 | 0 | 1.55 | 1.89 | 1.41 |
| Stages of Addition | 4 | 1 | 1 | 4 | 4 | 5 |
| Polyisobutenyl Succinic Anhydride (PIBSA)/Oil | 29.40/20.70 | 21.69/7.23 | 47.16/86.10 | 21.91/21.91 | 26.5/26.5 | 25/25.0 |
| Diethylene Triamine (DETA), charged | 2.150 | 1.95 | 3.68 | 2.33 | 2.68 | 3.57 |
| Flush Oil for DETA | .76 | .66 | .66 | 2.38 | 2.38 | 3.4 |
| Weight samples removed | — | — | — | 16.03 | 1.89 | 3.46 |
| Weight extra oil added | — | — | — | 48.47 | 30.95 | 60.54 |
| Sulfonic acid (50% a.i.) added | — | — | — | 9.34 | 9.11 | 18.96 |
| Sulfonic acid flush oil | — | — | — | 3.35 | 2.63 | 5.06 |
| PIBSA/EPSA (calculated mole ratio) | 1.003 | 1.054 | 1.767 | 1.005 | 1.0 | 1.2 |
| (EPSA + PIBSA) DETA (calculated mole ratio) | 1.995 | 2.173 | 2.012 | 1.898 | 2.0 | 1.3 |
| Wt. % Nitrogen (calculated) | .345 | .306 | 0.398 | .314 | .36 | .42 |
| Wt. % Ethylene-Propylene Copolymer (calculated) | 15.63 | 12.87 | 7.211 | 13.15 | 9.822 | 7.715 |

TABLE IV

| | Examples | | | | | | |
|---|---|---|---|---|---|---|---|
| Performance | 6 | 7 | 8 | 9 | 10 | 11 | Control |
| Cat. 1H$_2$, TWD Rating (0 = Clean) at 120 hours | 279 | 220 | 31 | 31 | 80 | 143 | 427 |
| Sequence VD, (MERIT: 10 = clean) | | | | | | | |
| Average varnish, Merit | 7.20 | | 7.24 | 6.81 | 9.13 | | 5.42 |
| Average piston skirt varnish, Merit | 6.64 | | 7.14 | 6.86 | 6.81 | | 5.65 |
| Average sludge, Merit | 9.61 | | 9.47 | 9.62 | 9.49 | | 7.48 |

As seen by the preceding data, a significant improvement was obtained in Examples 6 to 11 wherein the ethylene-propylene copolymer was derivatized to impart dispersancy as opposed to the Control which used the ethylene-propylene copolymer per se in the test formulation. The nitrogen additive concentrate content of the Examples 6 to 11 ranged from 0.306 to 0.42 wt. %. However, concentrates in a wide range of nitrogen content can be made, for example 0.05 to 1.5 wt. %, preferably 0.1 to 1.0 wt. % nitrogen based on the weight of the additive concentrate.

What is claimed is:

1. Oil soluble reaction product, useful as a V.I.-dispersant for lubricating oil, comprising the reaction product of:
   (a) an oil soluble ethylene copolymer comprising within the range of about 15 to 90 wt. % ethylene and about 10 to 85 wt. % of one or more $C_3$ to $C_{28}$ alpha-olefin, having a number average molecular weight within a range of about 5,000 to 500,000 and grafted with an ethylenically unsaturated carboxylic acid material having 1 to 2 carboxylic acid groups or anhydride groups;
   (b) an alkylene or oxyalkylene amine having at least two primary amine groups selected from the group consisting of alkylene polyamines having alkylene groups of about 2 to 7 carbon atoms and 2 to 11 nitrogens, and polyoxyalkylene polyamines, wherein the alkylene groups contain 2 to 7 carbon atoms and the number of oxyalkylene groups will be about 3 to 70; and,
   (c) a long chain hydrocarbyl substituted succinic anhydride or acid having 50 to 400 carbon atoms.

2. A reaction product according to claim 1, formed by simultaneously reacting said (a), (b) and (c) with removal of water.

3. A reaction product according to claim 1, wherein said (b) and (c) are first pre-reacted, followed by reaction with said (a).

4. A reaction product according to claim 1, wherein said (a) comprises a copolymer consisting essentially of about 30 to 80 wt. % ethylene and about 20 to 70 wt. % propylene, having a number average molecular weight in the range of about 10,000 to 200,000 grafted with maleic anhydride.

5. A reaction product according to claim 1, wherein said (c) is a hydrocarbyl substituted succinic acid or anhydride wherein said hydrocarbyl substituent is an alkenyl or alkyl group derived from a polymer of $C_2$ to $C_5$ mono-olefin.

6. A reaction product according to claim 4, wherein (a) consists essentially of ethylene and propylene grafted with maleic anhydride, wherein about 1 to 2 molar proportions of (b) and about 1 to 4 molar proportions of (c) are used per molar proportion of maleic anhydride moiety.

7. A reaction product according to claim 1, wherein said amine is alkylene polyamine of the general formula

wherein x is about 1 to 10 and the alkylene radical is ethylene.

8. A reaction product according to claim 5, wherein said carboxylic acid (c) is polyisobutenyl succinic anhydride having about 50 to 400 carbon atoms in said polyisobutenyl group.

9. A reaction product according to claim 1 comprising the reaction product of 5 to 30 weight % of said ethylene copolymer in 95 to 70 weight percent of mineral lubricating oil, free radical grafted with maleic anhydride whereby both said copolymer and some oil have become reacted with maleic anhydride, then reacting with a mixture of diethylene triamine and polyisobutenyl succinic anhydride having 50 to 400 carbons in said polyisobutenyl substituent.

10. A reaction product according to claim 1, which is the reaction product of 5 to 30 weight % of ethylene-propylene copolymer in 95 to 70 weight % mineral lubricating oil free radical grafted with maleic anhydride using a free radical peroxide initiator, and further reacted with an ashless dispersant reaction product of about 1 to 2 moles polyisobutenyl succinic anhydride having 50 to 400 carbons in said polyisobutenyl substituent with a molar proportion of diethylene triamine.

11. A reaction product according to claim 10 which is finally treated with an alkyl benzene sulfonic acid having an average of about 24 carbons in said alkyl group.

12. A reaction product according to claim 1, wherein 5 to 30 weight % of ethylene-propylene copolymer in 95 to 70 weight % mineral lubricating oil is free radical grafted with maleic anhydride using a peroxide initiator, and is then simultaneously reacted with diethylene triamine and polyisobutenyl succinic anhydride.

13. An oil composition comprising a major proportion of oil selected from the group consisting of lubricating oil and fuel oil and about 0.001 up to 50 wt. % of the oil soluble reaction product of claim 1.

14. An oil composition according to claim 13, which is a crankcase motor lubricating oil composition containing about 0.01 to 15 wt. % of said reaction product.

15. An oil composition according to claim 13, which is an additive concentrate comprising a major amount of mineral lubricating oil and about 5 up to 50 wt. % of said reaction product.

16. A lubricating oil composition comprising a major amount of lubricating oil and a minor amount of the reaction product of claim 2.

17. A lubricating oil composition comprising a major amount of lubricating oil and a minor amount of the reaction product of claim 3.

18. A lubricating oil composition comprising a major amount of lubricating oil and a minor amount of the reaction product of claim 4.

19. A lubricating oil composition comprising a major amount of lubricating oil and a minor amount of the reaction product of claim 5.

20. A lubricating oil composition comprising a major amount of lubricating oil and a minor amount of the reaction product of claim 6.

21. A lubricating oil composition comprising a major amount of lubricating oil and a minor amount of the reaction product of claim 7.

22. A lubricating oil composition comprising a major amount of lubricating oil and minor amounts of the reaction product of claim 8.

23. A lubricating oil composition comprising a major amount of lubricating oil and a minor amount of the reaction product of claim 9.

24. A lubricating oil composition comprising a major amount of lubricating oil and a minor amount of the reaction product of claim 10.

25. A lubricating oil composition comprising a major amount of lubricating oil product and a minor amount of the reaction product of claim 11.

26. In a process for preparing VI-dispersant for lubricating oil which comprises grafting an oil soluble ethylene copolymer having a number average molecular weight in the range of about 5,000 to 500,000 and comprising about 15 to 90 wt. % ethylene and about 10 to 85 wt. % $C_3$ to $C_{28}$ olefin, in a lubricating mineral oil solution with maleic anhydride using a free radical initiator at elevated temperatures, wherein a portion of said oil also becomes grafted with maleic anhydride and wherein the amount of maleic anhydride that is to be grafted exceeds its solubility in said oil, the improvement which comprises maintaining said maleic anhydride below its solubility limit in said oil during the grafting reaction by either periodic addition or continuous addition of at least a portion of said maleic anhydride after grafting begins and after the addition of at least a portion of said initiator.

27. In a process according to claim 26, wherein said improvement also comprises adding proportional amounts of said free radical initiator together with, or alternating with, said maleic anhydride, and wherein said free radical initiator is added to the reaction mixture either periodically or continually with said maleic anhydride.

28. In a process according to claim 26, wherein the concentration of unreacted maleic anhydride is maintained below 1 wt. % maleic anhydride based on the weight of said copolymer and oil, during said grafting, and which further comprises the reaction of said grafted polymer in oil with an alkylene or oxyalkylene polyamine having at least two primary amine groups and long chain hydrocarbyl substituted succinic anhydride or acid having 50 to 400 carbon atoms.

29. In a process according to claim 28, wherein the concentration of unreacted maleic anhydride is maintained below about 0.4 wt. % maleic anhydride, based on the weight of said copolymer and oil, during said grafting, said ethylene copolymer has a number average molecular weight of about 20,000 to 200,000 and comprises about 30 to 80 wt. % ethylene and about 20 to 70 wt. % propylene; said polyamine is a polyalkylene amine of the general formula:

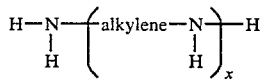

wherein x is about 1 to 10, and the alkylene radical contains about 2 to 7 carbon atoms; and wherein said succinic anhydride or acid is polyisobutenyl succinic anhydride.

30. In a process according to claim 29, wherein said polyamine is triethylene diamine, in a relative molar ratio of about 1.5 to about 3.0 mole of said succinic anhydride and about 1.0 to 2.0 mole of said diethylene triamine per molar moiety of maleic anhydride grafted on said ethylene-propylene copolymer.

31. In a process according to claim 28, wherein unreacted maleic anhydride is maintained during the course of the grafting reaction at a concentration below about 0.4 wt. % of maleic anhydride, based upon the total weight of the copolymer-oil solution present.

32. In a process according to claim 31, wherein said grafting reaction is carried out under nitrogen for about 0.5 to 12 hours at temperatures of about 150° to 220° C. with di-tertiary butyl peroxide and wherein said subsequent reaction with said amine and a long chain acid is carried out in said mineral oil solvent at a temperature of 150° to 230° C. for a period of time of about 1.0 to 10 hours; such that no substantial increase in viscosity occurs upon storage of said product.

33. In a process according to claim 32 wherein the nitrogen content of the reaction product is about 0.1 to 1.0 wt. %.

* * * * *